United States Patent Office.

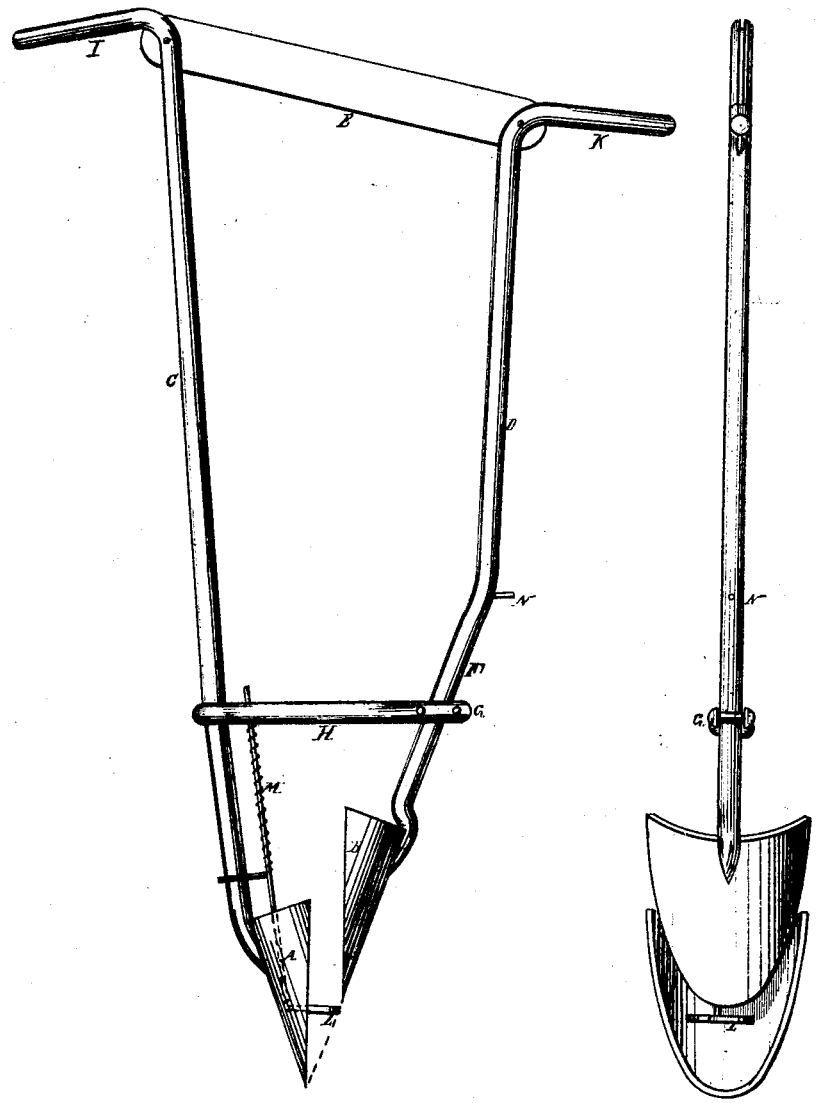

ASAHEL DAVIS, OF LOWELL, MASSACHUSETTS.

Letters Patent No. 110,211, dated December 20, 1870; antedated December 14, 1870.

IMPROVEMENT IN TRANSPLANTING-IMPLEMENTS.

The Schedule referred to in these Letters Patent and making part of the same.

I, ASAHEL DAVIS, of Lowell, in the county of Middlesex and State of Massachusetts, have invented a new and Improved Implement for Digging or Transplanting, of which the following is a specification.

Nature and Objects of the Invention.

The first part of my invention consists in the arrangement of two blades with rods affixed, with a jointed bar and a guide-curve formed in one rod, acting against a guide, placed on an arm, affixed to the other rod, so that, by placing the blade which is affixed to the last mentioned rod, as desired, and pressing the other blade by its rod or handle, the last blade is guided to move in the general direction of the back of the blade toward the first blade; the object of this part of my invention being to inclose a small portion of earth or other matter, and remove it from its position.

The second part of my invention consists in the arrangement, with the blades and rods and the jointed bar and guides, of a forked follower, having a stem and guides, in connection with the blade and rod to which the guide arm is affixed; the object of this part of my invention being to compact the earth around a plant within the closed blades when the implement is used as a transplanter, and to relieve the blades with certainty of the earth when the blades are withdrawn from the earth or ground, in the position it is desired to place the plant.

Description of the Accompanying Drawing.

Figure 1 is an elevation of the implement.

Figure 2 is a side elevation of the implement, showing the end, which is at the right hand in fig. 1.

General Description.

A and B are the blades;

C and D are the rods, with handles I and K;

E is the jointed bar;

F, the guide curve; and

G, the guide in a fork of the arm H, which arm also affords a position for the foot in pressing the blade A into the earth;

L is the forked follower, attached to the rod C by a slide, and guided also by the stem of the follower passing through a guide on the arm H.

A spiral spring, M, presses the fork against the earth in the closed blades.

When used as a transplanter, the implement is placed with the fork around the stem of a plant, and the blade A is pressed down by the handle I, assisted, if desired, by the pressure of the foot on the arm H, the blade then about one-half inclosing the roots of the plant; the other blade is then forced down by pressing on the handle K, assisted, if needed, by the pressure of the foot against the peg N, on the rod D, which peg also serves to prevent the blade B being run beyond the lower edge of the blade A. The implement is then lifted by the handle I and carried to the position in which it is desired to transfer the plant, when the closed blades are pressed into the earth by the handle K, and by the foot in the peg N, when the blade B is withdrawn by the handle K, and then the blade A by its handle I, the follower pressing upon the earth around the plant, and preventing its being drawn up by the blade. When not needed, the follower may be dispensed with.

The jointed bar E and arm H may each be made in two or more pieces, either of tubing, as in a telescopic arrangement, so called, or of bars placed side by side and secured by set screws, or their equivalent; the bar and arm will then be adjustable, so that a greater or lesser amount of material may be inclosed by the blades.

The blades may be made of any suitable form, and it will sometimes be found desirable to give one or both blades a curved form, in the direction of its motion, when the guide curve and the proportion of the other guiding parts may be made so that the moving blade may be carried in the general direction of the curve. The handles may be attached to the jointed bar or to extensions of this bar.

The arm H may be jointed to the rod C, and the guide curve modified so as to act as desired.

The positions of the jointed bar and the arm and curve may be reversed.

A second jointed bar may replace the guide and curve, or a guide and curve may be put in place of the jointed bar.

Claims.

1. The combination of the jointed bar E and rods C D, with blades A B affixed, as described.

2. The combination of the arm H and guide G and the guide curve F, with the rods C D, with blades A B affixed, as set forth.

3. The combination of the jointed bar E, and guide G and guide curve F, with the rods C D, and blades affixed, when made substantially as described, and for the purpose set forth.

4. The jointed bar E, the guide G and guide curve F, and the rods C D, and blades A B affixed, in connection with the forked follower L, when made substantially as described and for the purposes set forth.

ASAHEL DAVIS.

Witnesses:
NATHANIEL HILL, Jr.,
H. W. BOARDMAN.